United States Patent
Steinhardt

(10) Patent No.: US 10,378,901 B2
(45) Date of Patent: Aug. 13, 2019

(54) METHOD AND SYSTEM FOR ADAPTING A NAVIGATION SYSTEM

(71) Applicant: Continental Teves AG & Co. oHG, Frankfurt (DE)

(72) Inventor: Nico Steinhardt, Frankfurt (DE)

(73) Assignee: Continental Teves AG & Co. OHG, Frankfurt am Main (DE)

(*) Notice: Subject to any disclaimer, the term of this patent is extended or adjusted under 35 U.S.C. 154(b) by 113 days.

(21) Appl. No.: 15/374,376

(22) Filed: Dec. 9, 2016

(65) Prior Publication Data

US 2017/0122743 A1     May 4, 2017

Related U.S. Application Data

(63) Continuation of application No. PCT/EP2015/062761, filed on Jun. 9, 2015.

(51) Int. Cl.
*G01C 21/16* (2006.01)
*G01S 19/47* (2010.01)
(Continued)

(52) U.S. Cl.
CPC ........... *G01C 21/165* (2013.01); *G01S 19/40* (2013.01); *G01S 19/47* (2013.01); *G01S 19/49* (2013.01)

(58) Field of Classification Search
CPC combination set(s) only.
See application file for complete search history.

(56) References Cited

U.S. PATENT DOCUMENTS 9,568,321 B2 * 2/2017 Bharadwaj ........... G01C 21/165
9,868,321 B2   1/2018 Tyson
(Continued)

FOREIGN PATENT DOCUMENTS

CN      102221365 A      10/2011
DE   102010063984 A1      8/2011
(Continued)

OTHER PUBLICATIONS

PCT/EP2015/062761 Search Report and Written Opinion of the International Search Authority dated Sep. 11, 2015.
(Continued)

*Primary Examiner* — Thomas G Black
*Assistant Examiner* — Ana D Thomas

(57) ABSTRACT

A navigation system comprises a base system and at least one correction system, wherein the base system and the correction system each capture measured values. The measured values describe navigation data and are each burdened with error values. The error values describe discrepancies in the measured values from the described navigation data. The error values of the measured values of the base system are recognized by the measured values of the correction system. The recognition is effected by considering a capture uncertainty in the correction system. The consideration represents adaptation of parameters of a stochastic noise model, which prescribes a weighting for measured values of the correction system with respect to measured values of the base system in accordance with the parameters. The adaptation of the parameters is chosen on the basis of the capture uncertainty in accordance with a characteristic curve or a family of characteristic curves.

18 Claims, 2 Drawing Sheets

(51) Int. Cl.
     *G01S 19/49*          (2010.01)
     *G01S 19/40*          (2010.01)

(56) References Cited

U.S. PATENT DOCUMENTS

| | | | | |
|---|---|---|---|---|
| 10,168,158 | B2 * | 1/2019 | Steinhardt | G01C 21/165 |
| 2002/0158796 | A1 * | 10/2002 | Humphrey | G01C 21/165 |
| | | | | 342/357.31 |
| 2004/0024750 | A1 * | 2/2004 | Ulyanov | G06N 10/00 |
| 2005/0251328 | A1 | 11/2005 | Merwe et al. | |
| 2011/0243454 | A1 * | 10/2011 | Miyajima | G01C 21/28 |
| | | | | 382/195 |
| 2017/0122770 | A1 * | 5/2017 | Steinhardt | G01C 21/165 |
| 2017/0299393 | A1 * | 10/2017 | Steinhardt | G01C 21/165 |
| 2017/0307379 | A1 * | 10/2017 | Steinhardt | G01C 21/165 |

FOREIGN PATENT DOCUMENTS

| | | |
|---|---|---|
| DE | 102012216211 A1 | 3/2013 |
| DE | 102012216215 A1 | 3/2013 |
| DE | 102012219478 A1 | 4/2013 |
| WO | 02086533 A2 | 10/2002 |

OTHER PUBLICATIONS

German Search Report dated Feb. 5, 2015 for corresponding German Patent Application No. 10 2014 211 171.4.
Chinese Search Report dated Sep. 11, 2018 for corresponding Chinese Patent Application No. 201580030618.5.

* cited by examiner

METHOD AND SYSTEM FOR ADAPTING A NAVIGATION SYSTEM

CROSS REFERENCE TO RELATED APPLICATIONS

This U.S. patent application claims the benefit of PCT patent application No. PCT/EP2015/062761, filed Jun. 9, 2015, which claims the benefit of German patent application No. 10 2014 211 171.4, filed Jun. 11, 2014, both of which are hereby incorporated by reference.

TECHNICAL FIELD

The invention relates to a system and method for verifying measured data of a navigation system.

BACKGROUND

All measured data is in principle prone to error and in many cases, continuous availability of the measured data is not provided. Aside from the dependence of measured data on sensor-inherent properties, the measured data is also frequently dependent on environmental conditions. Sensor errors or measurement errors can here be divided into quasi-stationary portions which are constant over several measurements, such as a so-called offset, and statistical portions, which arise randomly from measurement to measurement, such as background noise. While the random portions cannot in principle be corrected deterministically, the quasi-stationary errors can in general be corrected if monitoring is possible. Non-correctable significant errors can usually be at least avoided if they can be detected.

In the prior art, sensor fusion methods are already known in this connection, which are usually also suited for correcting or filtering measured data of different sensors or sensor systems. In the automobile industry in particular, particular standards need to be observed here, since a plurality of different sensors senses a shared environment situation or motor vehicle state by means of different measuring principles, and describes this environmental situation or this motor vehicle state by means of a plurality of different measured data. For a sensor fusion that can be used in the automobile industry, the greatest possible degree of robustness is therefore required against random interferences, as is a detection and compensation of systematic errors. Equally, time influences on the measured data must be corrected and temporary failure or the non-availability of sensors must be bridged.

DE 10 2012 216 211 A1 describes a method for selecting a satellite, wherein the satellite is a satellite of a global navigation system. Before such a satellite is used for determining a position or a vehicle, the received GNSS signals are verified in different ways. For this verification, two different redundancies or known contexts are exploited in each case. Thus, DE 10 2012 216 211 A1 discloses, for example, the determination from the signal of a satellite of both the distance of the vehicle to the satellite and the relative speed of the vehicle in relation to the satellite. The distance can here be determined by means of the runtime of the signal, while the relative speed can be determined by means of phase measurement of the signal. Since the distance and the relative speed depend on each other, they can be verified against each other. Further, a verification can be conducted of the values determined from the signal against known framework conditions, since a vehicle usually progresses within a certain speed range. Also, it is described that when receiving several signals from different satellites, the distances to several satellites are determined and these distances are at the same time verified using trigonometric contexts and the known distances of the satellites in relation to each other. Finally, verification is also possible of the distance determined from the signal, or of the speed determined from the signal using other sensors, which also permit a determination of the position or a determination of the speed. If the signals of a satellite cannot be verified, this satellite is not used to determine the position or to determine the speed.

A sensor system comprising several sensor elements is known from DE 10 2010 063 984 A1. The sensor elements are designed in such a manner that they at least partially capture different primary measured values and at least partially use different measurement principles. Further measured values are then at least partially derived from the primary measured value of the sensor elements. Further, the sensor system comprises a signal processing facility, an interface facility and several function facilities. The sensor elements and all function facilities are here connected to the signal processing facility. The primary measured values therefore deliver redundant items of information which in the signal processing facility are compared with each other or which can mutually support each other. From the comparison of the observables calculated in different ways, conclusions can be drawn about the reliability and precision of the observables. The signal processing facility qualifies the precision of the observables and makes the observables available to different function facilities, together with a statement regarding the precision via an interface facility.

DE 10 2012 219 478 A1 discloses a sensor system for the independent evaluation of the integrity of its data. The sensor system is preferably used in motor vehicles and comprises several sensor elements which are designed in such a manner that they at least partially capture different primary measured values or at least partially use different measurement principles. The sensor system further comprises a signal processing facility which at least partially jointly evaluates the sensor signals and at the same time evaluates the information quality of the sensor signals. The signal processing facility additionally provides an item of information about the contradiction freedom of at least one date of a physical value, wherein the date of the physical value is calculated on the basis of the sensor signals from sensor elements, which either directly capture the physical value or the physical value can be calculated from its sensor signals. The information about the contradiction freedom of the date is now calculated on the basis of directly or indirectly redundant sensor information provided.

The generic methods and sensor systems which are known in the prior art are however disadvantageous in that no account is taken of the environment-dependent or situation-dependent availability of the correction measurements. Even the total failure of certain systems is often not taken into account. This leads to non-optimal results of the merged and corrected data.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The object of the invention is thus to recommend an improved method for correcting navigation data.

The invention relates to a method for adapting a navigation system. A navigation system comprises a base system and at least one correction system, wherein the base system and the correction system each capture measured values. The measured values describe navigation data and are each burdened with error values. The error values describe discrepancies in the measured values from the described navigation data. The error values of the measured values of the base system are recognized by the measured values of the correction system. The recognition is effected by considering a capture uncertainty in the correction system. The consideration represents adaptation of parameters of a stochastic noise model, which prescribes a weighting for measured values of the correction system with respect to measured values of the base system in accordance with the parameters. The adaptation of the parameters is chosen on the basis of the capture uncertainty in accordance with a characteristic curve or a family of characteristic curves. This results in a weighting, which is largely optimally adjusted to the respective capture uncertainty of the at least one correction system, and which is enabled in the form of an adaptation of the parameters of the stochastic noise model. This in turn enables an improved and reliable recognition of the error values of the measured values of the base system and thus an improvement overall in the reliability of the measured values of the base system.

An adjustment in accordance with a characteristic curve or a family of characteristic curves here enables a comparatively simple, although at the same time also reliable, procedure.

The capture uncertainty preferably describes a so-called noise of the measured values of the at least one correction system. The noise usually characterizes the precision or reliability of captured measured values. The noise of the system states, which should here not be considered in greater detail, should be differentiated from the noise of the measured values.

The stochastic noise model is also known as a so-called noise matrix, wherein the noise matrix is preferably designed as an algorithm in a fusion filter.

Preferably, within the scope of a preprocessing step of the measured values by the at least one correction system, an error dependency calculation is preferably conducted, in particular a Gauss error dependency calculation. This already permits an independent evaluation or a recognition of the capture uncertainty.

For example, a differentiation can be made between three states or capture uncertainties for the at least one correction system. When the at least one correction system is available to an unlimited degree, the capture uncertainty is on the usual scale, and the navigation system is largely optimally functional without further adjustment. If the at least one correction system is only available to a limited degree, however, the parameters—and thus the navigation system—are accordingly adapted to this only partial availability. The term availability or available describes the functionality of the correction system or navigation system depending on the capture uncertainty. An unlimited availability here covers the entire possible bandwidth of availability stages, between not available and fully available. It is therefore preferred that the different stages of partial availability are differentiated and an adaptation of the parameters is conducted accordingly. For example, when only unlimited availability is provided in the case of closely coupled sensors, i.e. with so-called tight coupling, in this case, further operation is only possible with unchanged parameters for an ample time period, since the close coupling still permits for some time a correction of the measured values of the at least one correction system within the scope of preprocessing. The third possible state is present when the at least one correction system is not available. In this case, the measured values are preferably already rejected within the scope of preprocessing.

Preferably, it is provided that in addition, a correction of at least the error values of the measured values of the base system is conducted by means of the measured values of the at least one correction system, wherein the correction is conducted taking into account the capture uncertainty of the at least one correction system. This leads to the advantage that the recognition of the error values gains a specific meaning, namely subsequently the correction of at least the error values of the measured values of the base system. This improves and renders more precise the navigation information determined by the navigation system, such as a position or a speed. In particular, the error values of the measured values of the at least one correction system are also recognized and corrected, wherein the error values of the measured values of the at least one correction system are in a particularly preferred manner recognized and corrected by means of the measured values of the base system or measured values of a further correction system. Equally, however, a detection and correction of the error values of a suitable stochastic model is also possible and preferred, wherein the model takes account of the individual properties of the respective sensor system.

Further, it is preferred that the base system is an inertia navigation system, and the at least one correction system is a global satellite navigation system. Thus, the present invention is particularly well suited for navigation purposes and for navigation systems, preferably in motor vehicles. The navigation system thus determines e.g. the position, in particular the position of a motor vehicle, from the measured values. The global satellite navigation system can for example be a so-called GPS navigation system. It is particularly advantageous that the satellite navigation system comprises at least two satellite signal receivers. As a result, the quality of the captured satellite signals improves, and thus also the reliability and precision of the satellite navigation system. The inertia navigation system as a base system offers the advantage that it has the comparatively highest level of availability, since it has a comparatively high issue rate of the captured measured values and also operates largely independently of external interfering influences.

Additionally, it is preferred that the navigation system also comprises an odometry navigation system. The odometry navigation system here at first determines the speed, e.g. via the known roll-off circumference of the motor vehicle tires, and thus enables a position determination taking into account the steering angle within the scope of couple navigation. This improves the precision and reliability of the navigation system overall.

Advantageously, it is provided that the characteristic curve or characteristic family is determined by means of theoretical modeling or by means of a series of measurements. Here, the theoretical modeling can e.g. for the global satellite navigation system describe the elevation angles of the navigation satellites, e.g. the GPS satellites, which is calculable from the constellation data, and the signal-noise ratio (SNR), which is dependent on the respective elevation angle. Equally, however, it is also possible to determine this connection within the scope of a series of measurements or trial series. Thus, by means of the characteristic curve or characteristic family, the anticipated SNR or the anticipated capture uncertainty is provided in the sense of a measurement noise.

By further characteristic curves or characteristic families, or the combination of several characteristic curves relating to a corresponding characteristic family, further influences such as passages between tall buildings, tunnels, etc. on the measurement noise or the SNR or the capture uncertainty can be taken into account. Further, the capture uncertainty or measurement noise or the SNR of an odometry navigation system can also be shown in the form of a characteristic curve or characteristic family. The capture uncertainty or measurement noise or the SNR of an odometry navigation system can here be shown e.g. in dependence on the road covering, e.g. asphalt or crushed chippings, the temperature or the humidity.

It is particularly advantageous that the capture uncertainty is impacted by an ion sphere influence and/or an electromagnetic interference and/or electromagnetic refraction effects and/or electromagnetic diffraction effects and/or electromagnetic reflection effects in the signal dissemination path of signals of the global satellite navigation system. These are the typical noise influences which usually impact the capture uncertainty. By taking it into account, a plurality of noise influences which impact capture uncertainty can thus be taken into account.

Additionally, it is preferred that the capture uncertainty is determined by means of environmental sensors. Through the use of environmental sensors, many influences which impact capture uncertainty can be comparatively easily determined. For example, by means of a camera sensor, a passage through tall buildings or a tunnel can be recognized. Equally, through the use of a camera sensor, a road covering can also be recognized. A temperature sensor and a rain sensor can also recognize the effects which impact the capture uncertainty, wherein e.g. rain can impact both the capture uncertainty of a satellite navigation system and the capture uncertainty of an odometry navigation system.

Further, it is preferred that the capture uncertainty of the at least one correction system is determined by means of a digital map. With a digital map, e.g. passages between tall buildings, tunnels and road coverings can be determined, at least insofar as they are stored in the digital map. Using position determination of the vehicle or of the navigation system, a plurality of influences which impact the capture uncertainty can be determined in a simple manner.

Further, it is provided that the measured values are merged to become a shared fusion data record. A shared fusion data record is usually more reliable and more precise than individual measured values, and in particular, it permits by means of an error estimation a comparatively reliable evaluation of the precision or reliability of the merged measured values or navigation data.

Preferably, it is provided that in order to create the shared fusion data record, only measured values are used with an identical time stamp. The measured values thus describe the same physical value at the same point in time. Thus, the measured values used are ideally identical, or must ideally be so. This results in the advantage that error values of the measured values can be better and more reliably identified. Thus, the precision and reliability of the fusion data record is also improved.

It is advantageous that the recognition and/or correction is conducted by means of an error state space filter, in particular by means of error state space Kalman effect filter. The error state space filter is here a fusion filter for the fusion of the measured values, in particular for the fusion of normally distributed measured values. At the same time, the error state space filter preferably estimates or determines the error values at least of the base system. By means of the at least one correction system, the error values and if necessary also the unknown values of the inertia navigation system can be estimated or determined. A special feature of the error state space filter is therefore that instead of the sensor signals or measured values, only error values are incrementally estimated or determined, and subsequently corrected. The error values namely have a significantly lower time dynamic than the measured values themselves, as a result of which a decoupling to a large extent of the dynamic of the error state space filter from the properties of the base system or the at least one correction system is achieved.

The invention further relates to a system for adapting a navigation system. The navigation system comprises a base system and at least one correction system, wherein the base system and the correction system each capture measured values. The measured values describe navigation data and are each burdened with error values. The error values describe discrepancies in the measured values from the described navigation data. The error values of the measured values of the base system are recognized by the measured values of the correction system. The recognition is effected by considering a capture uncertainty in the correction system. The consideration represents adaptation of parameters of a stochastic noise model, which prescribes a weighting for measured values of the correction system with respect to measured values of the base system in accordance with the parameters. The adaptation of the parameters is chosen on the basis of the capture uncertainty in accordance with a characteristic curve or a family of characteristic curves.

Additionally, the invention relates to a use of the system according to the invention in a motor vehicle.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
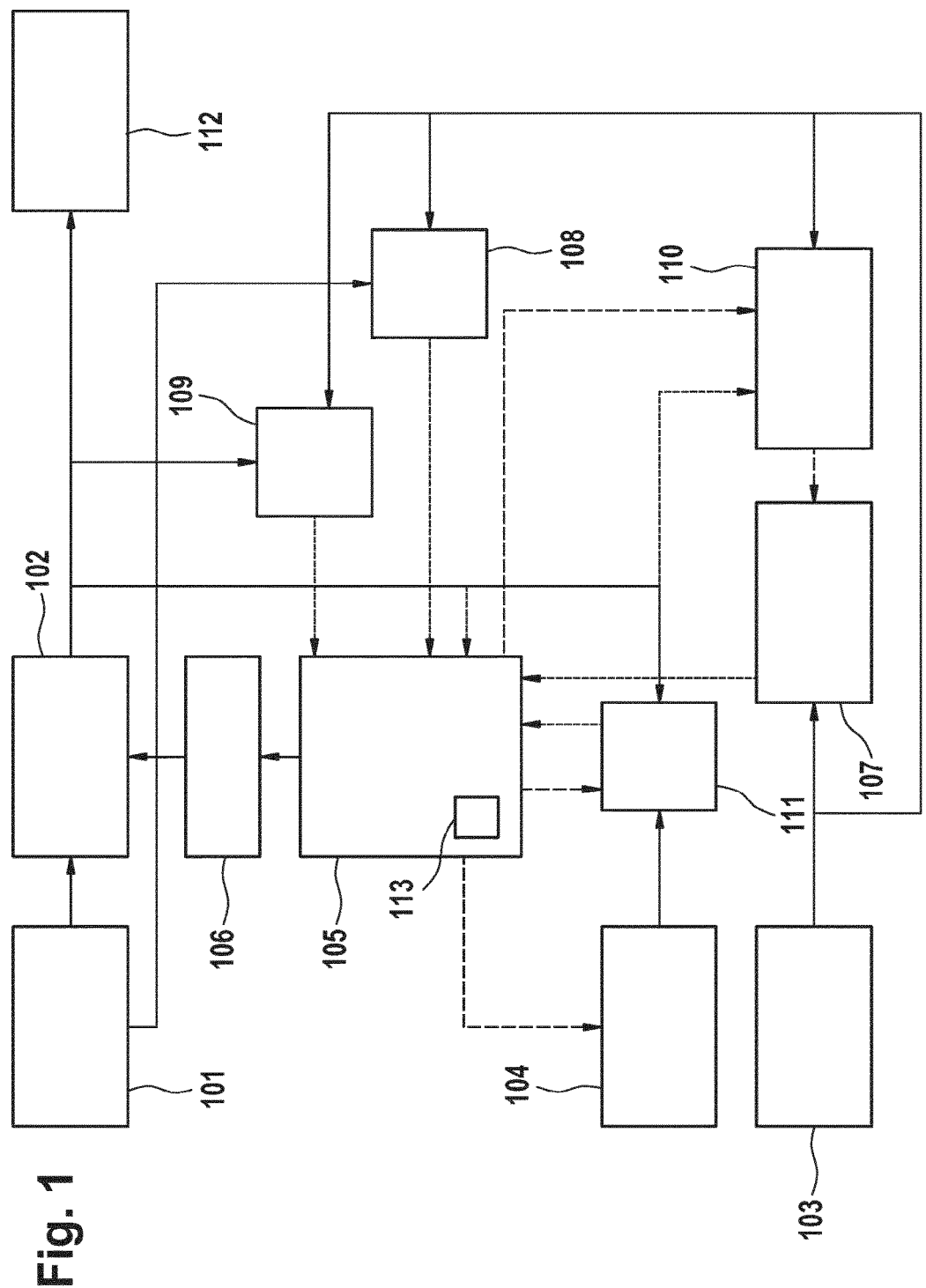
FIG. 1 shows as an example a possible design of a system according to the invention which is designed to determine a position, in a motor vehicle.

FIG. 1 shows a schematic depiction of an exemplary embodiment of the system according to the invention, which is provided for arrangement and use in a motor vehicle (not shown). Here, all elements or components or the base system or the correction system comprised by the system are displayed as function blocks and the interaction between them is shown.

The navigation system comprises an inertia navigation system 101, which is designed in such a manner that it can capture at least the accelerations along a first, a second and a third axis, and at least the rotation rates around the first, the second and the third axis. The first axis here corresponds according to the example to the longitudinal axis of the motor vehicle, the second axis corresponds to the transverse axis of the motor vehicle, and the third axis corresponds to the high axis of the motor vehicle. These three axes form a Cartesian coordinate system, the so-called motor vehicle coordinate system.

The inertia navigation system 101 forms, according to the example, the so-called base system, the measured values of which are corrected by means of the so-called correction systems described below. The correction systems are here the odometry navigation system 103 and the satellite navigation system 104.

The system further comprises a so-called strapdown algorithm unit 102, in which a strapdown algorithm is conducted, by which the measured values from the inertia navigation system 101 are converted e.g. into position data. For this purpose, the measured values of the inertia navigation system 101, which of their nature describe accelerations, are integrated twice over time. Using simple integration over time, the alignment and speed of the motor vehicle continue to be determined. Additionally, the strapdown algorithm unit 102 compensates a Coriolis force acting on the inertia navigation system 101.

The output data of the strapdown algorithm unit 102 include the following physical values: the speed, the acceleration and the rotation rate of the motor vehicle, according to the example in relation to the named three axes of the motor vehicle coordinate system and according to the example additionally respectively related to a work coordinate system which is suitable for describing the alignment or dynamic values of the motor vehicle in the world. According to the example, this global coordinate system is a GPS coordinate system.

Additionally, the output data of the strapdown algorithm unit 102 includes the position with regard to the motor vehicle coordinate system and the alignment with regard to the global coordinate system. Additionally, the output data of the strapdown algorithm unit 102 indicate the variances as information on the data quality of the above navigation data. These variances are according to the example not calculated in the strapdown algorithm unit 102, but are only used by it and forwarded. The above navigation data calculated by the strapdown algorithm unit 102 is issued via the output module 112 and made available to other motor vehicle systems.

The navigation system also has an odometry navigation system 103 in the form of wheel rotation speed sensors for each wheel of the motor vehicle. According to the example, the motor vehicle has four wheels with four wheel rotation speed sensors, which respectively capture the rotation speed of the wheel assigned to them and its rotation direction. Further, the odometry navigation system 103 comprises a steering angle sensor element, which captures the steering angle of the motor vehicle.

Furthermore, the navigation system presented as an example may have a satellite navigation system 104, which is designed in such a manner that it determines the distance respectively between an assigned satellite and the motor vehicle and the speed respectively between the assigned satellite and the motor vehicle.

The system additionally may have a fusion filter 105. The fusion filter 105 provides a fusion data record 106 during the course of the shared evaluation of the measured data of the odometry navigation system 103, of the satellite navigation system 104 and the inertia navigation system 101. The fusion data record 106 may include the captured measured data of the different sensor systems, wherein the fusion data record 106 according to the example additionally comprises error values and variances assigned to the error values, which describe the data quality.

The measured values of the inertia navigation system 101 are stored by the fusion filter 105 for a specified period of time during the operation of the motor vehicle in an electronic data storage device 113 provided for the purpose. Here, the inertia navigation system 101 represents the so-called base system, while the odometry navigation system 103 and the satellite navigation system represent the so-called correction systems, the measured values of which are used to correct the measured values of the base system. Thus, it is ensured that values which at least appear to have been captured at an identical point in time can always be subjected to comparison.

The fusion data record 106 provided by the fusion filter 105 may have according to the example the quantitative errors of the base system which are determined by means of the verified measured values of the correction system.

The strapdown algorithm unit 102 corrects the measured values of the base system by means of the fusion data record 106.

The fusion data record 106 is calculated by the fusion filter 105 from the measured values of the odometry navigation system 103, the satellite navigation system 104 and the inertia navigation system 101.

The fusion filter 105 is according to one embodiment is designed as an error state space Kalman effect filter, i.e. as a Kalman effect filter, which in particular conducts a linearization of the measured values and in which the quantitative error values are calculated or estimated, and which operates sequentially and while doing so corrects the measured values available in the respective functional step of the sequence.

The fusion filter 105 is designed in such a manner that it always asynchronously captures the latest measured values from the inertia navigation system 101, the odometry navigation system 103 and the satellite navigation system 104. According to the example, the measured values are here fed via the motor vehicle model unit 107 and the alignment model unit 109.

The motor vehicle model unit 107 is designed in such a manner that from the measured values of the odometry navigation system 103, it calculates at least the speed along a first axis, the speed along a second axis and the rotation rate around a third axis and provides these to the fusion filter 105.

The system according additionally comprises a tire parameter estimation unit 110, which is designed in such a manner that it provides at least the dynamic loaded radius of all wheels, and additionally calculates the skew rigidity and wheel spin rigidity of all wheels and provides this to the motor vehicle model unit 107 as additional input values. The tire parameter estimation unit 110 is further designed in such a manner that it uses an essentially linear tire model for calculating the tire values.

The input values of the tire parameter estimation unit 110 are here the measured values which describe the wheel rotation speeds and the steering angle, at least in part the output values of the strapdown algorithm unit 102 and the variances determined by the fusion filter 105.

The system according to the example additionally comprises a GPS error recognition and verification unit 111, which is designed in such a manner that according to the example, it contains the measured values of the satellite navigation system 104 and at least in part the measured values of the strapdown algorithm unit 102, and takes them into consideration in its calculations. The GPS error recognition and verification unit 111 checks the measured values against a stochastic model which is adapted to the satellite navigation system 104. Insofar as the measured values correspond to the model within the scope of a tolerance which takes the noise into consideration, they are verified.

Here, the GPS error recognition and verification unit 111 is additionally connected to the fusion filter 105 at the data level and transfers the verified measured values to the fusion filter 105. The GPS error recognition and verification unit 111 is for example designed in such a manner that it implements a method for selecting a satellite e.g. by means of: measuring the position data of the motor vehicle in relation to the satellite based on the sensor signals of the satellite navigation system 104; determining the redundant reference position data of the motor vehicle based on the sensor signals of position data determined by the satellite navigation system 104; selecting the satellite when a comparison of the position data and the reference position data of a predetermined condition is sufficient. For the purpose of comparing the position data and the reference position data, a difference is formed between the position data and the reference position data. The predetermined condition is a maximum permitted deviation of position data from the reference position data. The maximum permitted deviation depends on a standard deviation, which is based on a sum of a reference variance for the reference position data and a measured variance for the position data. The maximum permitted deviation corresponds to a multiple of the standard deviation in such a manner that a probability that the position data falls into a deviation interval which depends on the standard deviation fails to reach a specified threshold value.

The system according to the example further comprises a standstill recognition unit 108, which is designed in such a manner that it can recognize a standstill of the motor vehicle and if a standstill of the motor vehicle is recognized, at least provides information from a standstill model to the fusion filter 105. The information from a standstill model here describes that the rotation rates around all three axes have a value of zero and the speeds along all three axes have a value of zero. Here, the standstill recognition unit 108 is according to the example designed in such a way that it uses as input data the measured values of the wheel speed sensors of the odometry navigation system 103 and the measured values of the inertia navigation system 101.

According to one embodiment, the sensor fusion system uses a first group of measured values which relate to a motor vehicle coordinate system, and additionally a second group of measured values which relate to a global coordinate system, wherein the global coordinate system is used to describe the alignment and dynamic values of the motor vehicle. By means of the alignment model unit 109, an alignment angle is determined between the motor vehicle coordinate system and the global coordinate system.

The alignment angle between the motor vehicle coordinate system and the global coordinate system, as determined by the alignment model unit 109, is here determined on the basis of the following physical values: the vectorial speed in relation to the global coordinate system; the vectorial speed in relation to the motor vehicle coordinate system; the steering angle; and the respective quantitative errors of the measured data or values which describe the forenamed values.

The alignment model unit 109 here resorts to all output data of the strapdown algorithm unit 102.

The alignment model unit 109 is according to the example designed in such a manner that it also, in addition to the alignment angle, calculates information about the data quality of the alignment angle in the form of a variance and provides it to the fusion filter 105.

The fusion filter 105 uses the alignment angle and the variance of the alignment angle in its calculations, the results of which it forwards via the fusion data record 106 to the strapdown algorithm unit 102.

The fusion filter 105 therefore captures the measured values of the inertia navigation system 101, the base system, and the odometry navigation system 103, and the correction systems of the satellite navigation system 104.

The system according to the example continuously checks the capture uncertainty of the two correction systems, i.e. of the odometry navigation system 103 and of the satellite navigation system 104. For this purpose, the elevation angle of the receivable navigation satellites is continuously determined. Additionally, the weather conditions are determined with the aid of a rain sensor, a temperature sensor, a camera sensor and a light sensor. Subsequently, the parameters of the stochastic noise model, which weights the captured measured values according to their measurement noise against the measured values of the base system, are adapted in accordance with the recognized capture uncertainty, i.e. in accordance with the elevation angle and the weather conditions, in line with a characteristic family. The characteristic family is digitally stored in an electronic storage device, not shown, in the vehicle.

Figure 2:
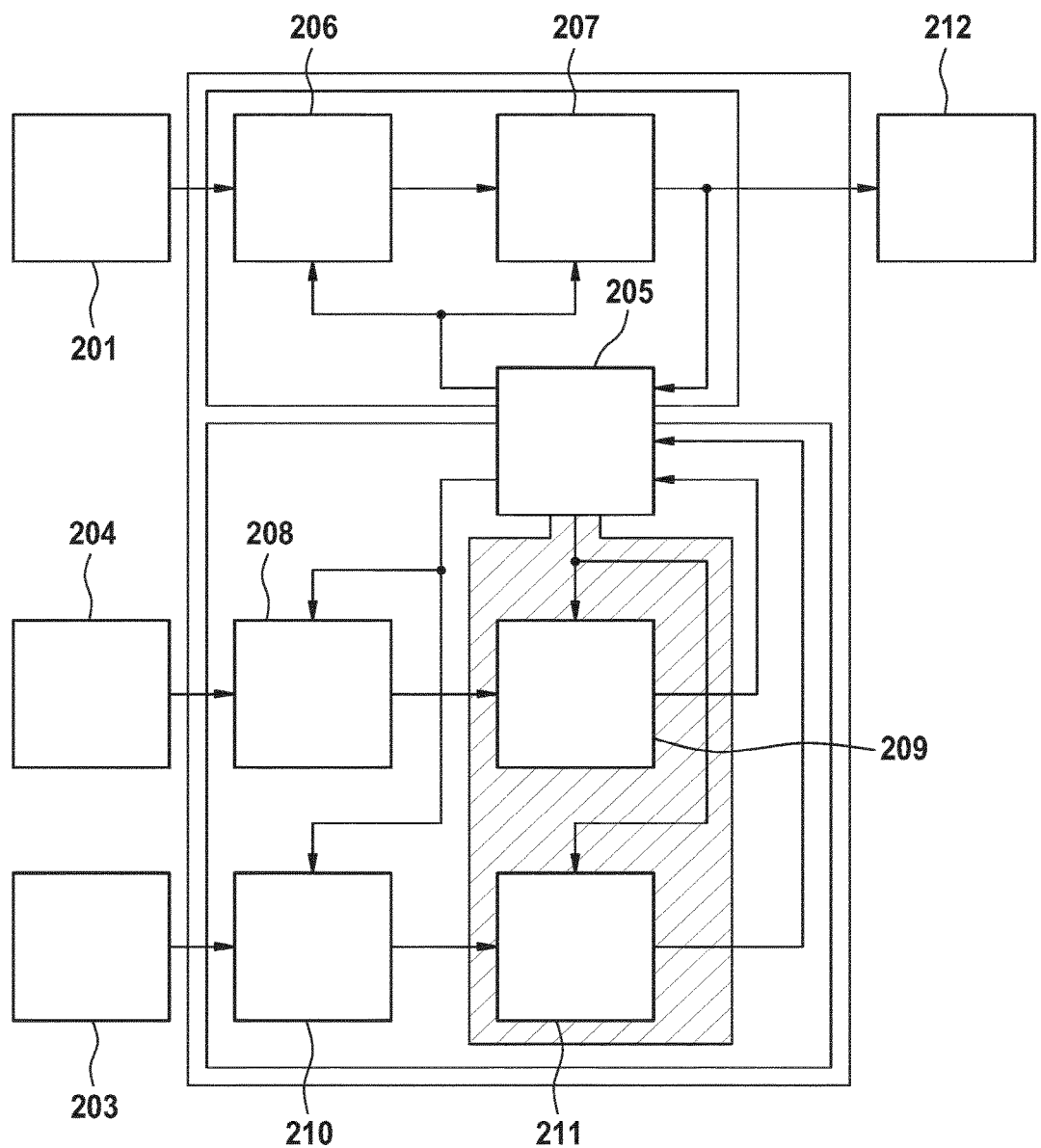
FIG. 2 shows as an example a further possible design of a system according to the invention which is also designed to determine a position, in a motor vehicle.

FIG. 2 shows as an example a further possible design of a system according to the invention which is also designed to adapt a navigation system, in a motor vehicle (not shown). The system comprises, according to the example, an inertia navigation system 201, a satellite navigation system 204 and an odometry navigation system 203 as different sensor systems. The inertia navigation system 201, the satellite navigation system 204 and the odometry navigation system 203 issue to the fusion filter 205 measured values which directly or indirectly describe navigation data, namely a position, a speed, an acceleration, an alignment, a yaw rate or a yaw acceleration. Here, the measured values are issued via a vehicle data bus, according to the example via a so-called CAN bus. According to the example, the satellite navigation system 204 issues its measured data in a raw data form.

As a central element during a determination of a position of the motor vehicle, the inertia navigation system 201 is used, which is a so-called MEMS-IMU (Micro-Electro-Mechanical-System-Inertial Measurement Unit), in combination with a strapdown algorithm unit 207, since this is assumed to be error-free, i.e. it is assumed that the values of the inertia navigation system 201 always correspond to their stochastic model, that they merely comprise noise influences and that they are thus free of external or random errors or interferences. The noise and remaining, non-modeled, errors of the inertia navigation system 201, such as non-linearity, are here assumed by the measurement area as being average value-free, stationary and normally distributed (so-called Gauss white noise).

The inertia navigation system 201 comprises three orthogonally capturing rotation rate sensors and three orthogonally capturing acceleration sensors in relation to each other respectively.

The satellite navigation system 204 comprises a GPS receiver which via the satellite signal runtime initially conducts distance measurements in relation to the receivable GPS satellites, and additionally, from the change to the satellite signal runtime, and additionally from the change in the number of wavelengths of the satellite signals, determines a travel path that has been covered by the motor vehicle. The odometry navigation system 203 comprises respectively one wheel speed sensor on each wheel of the motor vehicle, and one steering angle sensor. The wheel speed sensors respectively determine the wheel speed of the wheel assigned to them, and the steering angle sensor determines the relevant steering angle.

The inertia navigation system 201 issues its measured values to the preprocessing unit 206 of the inertia navigation system 201. The preprocessing unit 206 now corrects the measured values and the navigation data described in them by means of correction values, which the preprocessing unit 206 receives from the fusion filter 205. The measured values corrected in such a manner or the navigation data described therein are forwarded to the strapdown algorithm unit 207.

The strapdown algorithm unit 207 now conducts a position determination on the basis of the corrected measured values of the preprocessing unit 206. This position determination is here a so-called couple navigation on the basis of the inertia navigation system 201. For this purpose, the corrected measured values issued by the preprocessing unit 206 or the navigation data described therein are continuously integrated or aggregated over time. The strapdown algorithm unit 207 further compensates a Coriolis force acting on the inertia navigation system 201, which can impact the measured data of the inertia navigation system 201. For the purpose of determining the position, the strapdown algorithm unit 207 conducts over time a dual integration of the measured values captured by the inertia navigation system 201, which describe accelerations. This enables a continuation of a previously known position and a continuation of a previously known alignment of the motor vehicle.

In order to determine a speed or a rotation rate of the motor vehicle, the strapdown algorithm unit 207 conducts a simple integration of the values measured by the inertia navigation system 201 over time. Further, the strapdown algorithm unit 207 also corrects the determined position by means of corresponding correction values from the fusion filter 205. In this example, the fusion filter 205 conducts the correction only indirectly via the strapdown algorithm unit 207. The measured values or navigation data determined and corrected by the strapdown algorithm unit 207, i.e. The position, the speed, the acceleration, the alignment, the rotation rate and the rotation acceleration of the motor vehicle, are now transferred to the output module 212 and to the fusion filter 205.

The so-called strapdown algorithm conducted by the strapdown algorithm unit 207 is here only of low computational complexity and can thus be realized as a real time-capable base system. It represents a procedural progression towards the integration of the measured values of the inertia navigation system 201 with regard to speed, alignment and position, and contains no filters, so that an approximately constant latency period and group runtime results.

The term base system here describes the sensor system the measured values of which are corrected by means of the measured values of the other sensor systems, the so-called correction systems. According to the example, the correction systems, as described above, are an odometry navigation system 203 and a satellite navigation system 204.

According to the example, the inertia navigation system 201, the preprocessing unit 206 of the inertia navigation system 201 and the strapdown algorithm unit 207 together form the so-called base system, which additionally partially also includes the fusion filter 205.

The output module 212 forwards the navigation data which is determined and corrected by the strapdown algorithm unit 207 to any further systems of the motor vehicle required.

The measured values captured by the satellite navigation system 204 are, according to the example, initially forwarded to the preprocessing unit 208 of the satellite navigation system 204 in the form of sensor signals via a so-called UART data connection. The preprocessing unit 208 now determines from the measured values issued by the satellite navigation system 204, which represent GPS raw data and which also comprise a description of the circumlocutory path of the respective GPS satellite transmitting the GPS signals, a position and a speed of the motor vehicle in the GPS coordinate system. Additionally, the satellite navigation system 204 determines a relative speed of the motor vehicle in relation to the GPS satellites from which GPS signals are received. Furthermore, the preprocessing unit 208 corrects a time error of a receiver clock of the satellite navigation system 204 contained in the measured values, which arises due to a drift in the receiver clock, and by means of a correction model, corrects the changes in the signal runtime and signal path which are caused by atmospheric influences on the GPS signals transmitted by the GPS satellites. The corrections of the time error and of the atmospheric influences are conducted using the fusion filter 205 via correction values received via the CAN bus.

The satellite navigation system 204 is further assigned to the verification module 209, which verifies the measured values of the navigation data issued by the preprocessing unit 208, i.e. of the position and speed of the motor vehicle. The measured values verified by the verification module 209 are then issued to the fusion filter 205.

The system may further comprise a preprocessing unit 210 of the odometry navigation system 203, which receives measured values recorded by the odometry navigation system 203 via the CAN bus. The recorded measured values are in this case the measured values of the individual wheel speed sensors and the measured values of the steering angle sensor. The preprocessing unit 210 now determines the position and alignment of the motor vehicle in the motor vehicle coordinate system, using the measured values issued by the odometry navigation system 203 according to a so-called couple navigation method. Further, the speed, the acceleration, the rotation rate and the rotation acceleration of the motor vehicle are determined, also in the motor vehicle coordinate system. Additionally, the preprocessing unit 210 corrects the measured values received from the odometry navigation system 203 by means of correction values received from the fusion filter 205.

The odometry navigation system 203 is further assigned to the verification module 211, which verifies the measured values issued by the preprocessing unit 210, i.e. the position, the alignment, the speed, the acceleration, the rotation rate and the rotation acceleration of the motor vehicle. Since the interferences of the measured values from the odometry navigation system 203 are frequently random, environmental interferences, which are not equivalent to white noise, e.g. with a comparatively high wheel spin, the measured values determined by means of the inertia navigation system 201 and the satellite navigation system 204 are used in order to verify the measured values determined by the odometry navigation system 203. At first, however, here too the measured values are compared with a model for each individual sensor which is assigned to them, which takes into consideration measurement uncertainties such as noise influences. Insofar as the measured values correspond to the model within the specified limit values or tolerance areas, a first verification is conducted here and the values verified in such a manner are further processed. The verified values are then forwarded to a fusion filter 205. Insofar as a verification of these measured values cannot be conducted, the corresponding measured values are rejected and not further processed.

The fusion filter 205 is according to the example designed as an error state space Kalman effect filter. The main task of the fusion filter 205 is according to the example to correct the measured values of the base system, i.e. from the inertia navigation system 201, by means of measured values from the odometry navigation system 203 and the satellite navigation system 204, which represent the correction systems, and to issue the corresponding correction values to the strapdown algorithm unit 207. Since according to the example, the inertia navigation system 201 is assumed to be free of random errors and external interferences, the measured values of the inertia navigation system 201 are solely burdened with white noise.

Since the fusion filter 205 is a so-called error state space Kalman effect filter, only the quantitative error values of the measured values are determined and corresponding corrections are conducted. This simplifies and accelerates the fusion conducted by the fusion filter 205 of the measured values of the inertia navigation system 201, the odometry navigation system 203 and the satellite navigation system 204 to create a shared fusion data record. Thus, a real-time capable position determination and correction of the position determination is enabled.

The system shown in FIG. 2 depicts a so-called virtual sensor, wherein the inertia navigation system 201, the odometry navigation system 203 and the satellite navigation system 204 are not components of the virtual sensor, however. A virtual sensor is a system which, depending on the type of sensor systems incorporated—i.e. here the inertia navigation system 201, the odometry navigation system 203 and the satellite navigation system 204—continuously generates the same output data or outputs. On the basis of the output data or outputs, it cannot be seen which sensor systems are incorporated into the system.

The system according to the example shown in FIG. 2 also continuously checks the capture uncertainty of the two correction systems, i.e. of the odometry navigation system 203 and of the satellite navigation system 204. For this purpose, the elevation angle of the receivable navigation satellites is continuously determined. Additionally, the weather conditions are determined with the aid of a rain sensor, a temperature sensor, a camera sensor and a light sensor. Further, the environmental conditions are determined by means of the camera sensor and by means of a digital map in the motor vehicle. All these factors impact the capture uncertainty of satellite navigation systems 204. Subsequently, the parameters of the stochastic noise model, which weights the captured measured values according to their measurement noise against the measured values of the base system, are adapted in accordance with the recognized capture uncertainty, i.e. in accordance with the elevation angle and the weather conditions, in line with a characteristic family. The characteristic family here assigns a capture uncertainty of the satellite navigation system 204 to the respective specific combination of the elevation angle, the weather conditions and the environmental conditions.

Equally, a capture uncertainty of the odometry navigation system 203 is determined, whereby initially, a road covering is determined using the camera sensor, a temperature is determined using the temperature sensor and precipitation is determined using the rain sensor. Preferably, the determination of the road covering is additionally read of the digital map. Subsequently, the parameters of the stochastic noise model, which weights the captured measured values according to their measurement noise against the measured values of the base system, are adapted in accordance with the recognized capture uncertainty, i.e. in accordance with the road covering, the temperature and the precipitation, in line with a further characteristic family. The further characteristic family here assigns a capture uncertainty of the odometry navigation system 203 to the respective specific combination of the road covering, the temperature and the precipitation.

The two forenamed characteristic families are independent of each other and are digitally stored in an electronic storage device in the vehicle, not shown.

While the best modes for carrying out the invention have been described in detail the true scope of the disclosure should not be so limited, since those familiar with the art to which this invention relates will recognize various alternative designs and embodiments for practicing the invention within the scope of the appended claims.

The invention claimed is:

1. A method for adapting a navigation system in a vehicle, the method comprising:
   capturing measured values of navigation data from a base system and from at least one correction system, wherein the measured values include error values which describe discrepancies of the measured values from the navigation data, wherein the measured values include a speed and acceleration of the vehicle and the rotation rate of a motor supported by the vehicle;
   weighting of the measured values of the at least one correction system compared to the measured values of the base system;
   determining a stochastic noise model based on the weighting of the measured values, the stochastic noise model includes parameters that weigh the measured values according to measured noise associated with each measured value against the respective measured values;
   adjusting the parameters of the stochastic noise model based on a capture uncertainty of the measured value of the at least one correction system based on one of a characteristic curve and a characteristic family;
   determining the characteristic curve and the characteristic family by one of theoretical modeling, a series of measurements and a trial series, wherein the characteristic curve and the characteristic family describe a dependence of the capture uncertainty on influences acting on the navigation system;
   detecting at least one of the error values of the measured values of the base system based on the measured values of the at least one correction system; and
   outputting corrected measured values to one or more systems of the motor vehicle, the corrected measured values based on the stochastic noise model and the at least one of the error values.

2. The method according to claim 1, further comprising correcting at least one of the error values of the measured values of the base system based on the capture uncertainty of the at least one correction system.

3. The method according to claim 2, wherein either of the recognizing and the correcting are conducted by an error state space filter.

4. The method according to claim 3, wherein the filter is an error state space Kalman effect filter.

5. The method according to claim 1, wherein the base system is an inertia navigation system and the at least one correction system is a global satellite navigation system.

6. The method according to claim 5, wherein the capture uncertainty is impacted by at least one of an ion sphere influence, an electromagnetic interference, electromagnetic refraction effects, electromagnetic diffraction effects, and electromagnetic reflection effects in the signal dissemination path of signals of the global satellite navigation system.

7. The method according to claim 1, further comprising determining either of the characteristic curve and the characteristic family by one of theoretical modeling and a series of measurements.

8. The method according to claim 1, further comprising determining the capture uncertainty with environmental sensors.

9. The method according to claim 1, further comprising determining the capture uncertainty of the at least one correction system with a digital map.

10. The method according to claim 1, further comprising merging the measured values to become a shared fusion data record.

11. A system for adapting a navigation system supported by a motor vehicle, the system comprising:
a base system;
at least one correction system comprising:
an odometry navigation system including wheel rotation speed sensors, at least one such sensor being operatively coupled to each wheel of the motor vehicle, each wheel rotation speed sensor capturing wheel rotation speed and providing wheel rotation direction; and
a satellite navigation system providing a steering angle of the motor vehicle,
wherein the base system and the at least one of the odometry navigation system and the satellite navigation system capture measured values, the measured values include error values which describe discrepancies of the measured values from the navigation data;
a controller for the system with instructions for:
weighting of the measured values of the at least one correction system compared to the measured values of the base system to determine a stochastic noise model, the stochastic noise model includes parameters that weigh the measured values according to measured noise associated with each measured value against the respective measured values;
adapting the parameters of the stochastic noise model to take into consideration a capture uncertainty of the measured value of the at least one correction system in accordance with one of a characteristic curve and a characteristic family;
determining the characteristic curve and the characteristic family by one of theoretical modeling, a series of measurements and a trial series, wherein the characteristic curve and the characteristic family describe a dependence of the capture uncertainty on influences acting on the navigation system; and
detecting at least one of the error values of the measured values of the base system based on the measured values of the at least one correction system; and
an output module in communication with the correction module, the output module outputting corrected measured values to one or more systems of the motor vehicle, the corrected measured values based on the stochastic noise model and the at least one of the error values.

12. The system according to claim 11, wherein the controller further comprises instructions for correcting the at least of the error values of the measured values of the base system based on the capture uncertainty of the at least one correction system.

13. The system according to claim 12, wherein the base system is an inertia navigation system.

14. The system according to claim 13, wherein the controller further comprises instructions for determining either of the characteristic curve and the characteristic family by one of theoretical modeling and a series of measurements.

15. The system according to claim 14, wherein the capture uncertainty is impacted by at least one of an ion sphere influence, an electromagnetic interference, electromagnetic refraction effects, electromagnetic diffraction effects, and electromagnetic reflection effects in the signal dissemination path of signals of the global satellite navigation system.

16. The system according to claim 15, wherein the capture uncertainty is determined by environmental sensors.

17. The system according to claim 16, wherein the capture uncertainty of the at least one correction system is determined by a digital map.

18. The system according to claim 17, wherein the measured values are merged to become a shared fusion data record.

* * * * *